United States Patent
Mujibiya et al.

(10) Patent No.: US 10,623,901 B2
(45) Date of Patent: Apr. 14, 2020

(54) WIRELESS MOBILE COMMUNICATION APPARATUS, WIRELESS COMMUNICATION METHOD AND PROGRAM

(71) Applicant: Rakuten, Inc., Tokyo (JP)

(72) Inventors: Adiyan Mujibiya, Tokyo (JP); Jonathan Chung, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 15/557,474

(22) PCT Filed: Mar. 13, 2015

(86) PCT No.: PCT/JP2015/057596
§ 371 (c)(1),
(2) Date: Sep. 12, 2017

(87) PCT Pub. No.: WO2016/147278
PCT Pub. Date: Sep. 22, 2016

(65) Prior Publication Data
US 2018/0070202 A1     Mar. 8, 2018

(51) Int. Cl.
*H04W 4/029* (2018.01)
*H04M 1/00* (2006.01)
(Continued)

(52) U.S. Cl.
CPC .......... *H04W 4/029* (2018.02); *G01S 5/0263* (2013.01); *G01S 5/0284* (2013.01); *G01S 5/12* (2013.01);
(Continued)

(58) Field of Classification Search
CPC ....... H04W 4/80; H04W 4/029; H04W 84/10; H04L 63/0492; H04L 63/04; H04M 1/00;
(Continued)

(56) References Cited

U.S. PATENT DOCUMENTS 8,000,721 B2 * 8/2011 Hanner .................. G01C 21/08
                                                    455/41.1
9,253,592 B1 * 2/2016 Moscovich ............. H04W 4/80
(Continued)

FOREIGN PATENT DOCUMENTS

JP         4111165 B2     7/2008
JP      2011-096102    *  5/2011
(Continued)

OTHER PUBLICATIONS

English translation of the International Search Report for PCT/JP2015/057596.
(Continued)

*Primary Examiner* — Asghar H Bilgrami
(74) *Attorney, Agent, or Firm* — HEA Law PLLC

(57) ABSTRACT

Provided is a portable wireless communication device including: a relative position storage unit configured to store a relative position of each of a plurality of partner communication devices; a movement information reception unit configured to sequentially receive movement destination information indicating a movement destination of each of the plurality of partner communication devices; a relative position update unit configured to update the relative position of each of the plurality of partner communication devices based on the movement destination information; a transmission instruction unit configured to receive specification of a communication direction by a user, and to identify one of the partner communication devices based on the communication direction and the relative position of each of the partner communication devices; and a data transmission unit configured to transmit data to the identified partner communication device.

9 Claims, 12 Drawing Sheets

(51) Int. Cl.

| | | |
|---|---|---|
| *H04W 84/10* | (2009.01) | |
| *G01S 5/12* | (2006.01) | |
| *G01S 5/02* | (2010.01) | |
| *G06F 1/16* | (2006.01) | |
| *H04W 4/80* | (2018.01) | |
| *G06F 3/0488* | (2013.01) | |
| *H04M 1/725* | (2006.01) | |
| *H04W 4/02* | (2018.01) | |
| *H04W 92/08* | (2009.01) | |
| *H04W 76/14* | (2018.01) | |
| *H04W 64/00* | (2009.01) | |

(52) U.S. Cl.
CPC .......... *G06F 1/1694* (2013.01); *G06F 1/1698* (2013.01); *G06F 3/04883* (2013.01); *H04M 1/00* (2013.01); *H04M 1/7253* (2013.01); *H04W 4/02* (2013.01); *H04W 4/80* (2018.02); *H04W 84/10* (2013.01); *H04W 64/006* (2013.01); *H04W 76/14* (2018.02); *H04W 92/08* (2013.01)

(58) Field of Classification Search
CPC ...... H04M 1/7253; G01S 5/12; G01S 5/0263; G01S 5/0284; G06F 1/1698; G06F 1/1694; G06F 3/04883
See application file for complete search history.

(56) References Cited

U.S. PATENT DOCUMENTS

| | | | | |
|---|---|---|---|---|
| 9,400,798 B2 * | 7/2016 | Miyata | ................... | G06F 3/033 |
| 9,628,958 B1 * | 4/2017 | McBurney | ............ | H04W 4/027 |
| 9,679,414 B2 * | 6/2017 | Nicholas | ............... | G06T 19/006 |
| 2006/0109143 A1 * | 5/2006 | Rekimoto | ............. | H04W 76/14 |
| | | | | 340/990 |
| 2008/0039212 A1 | 2/2008 | Ahlgren et al. | | |
| 2009/0221298 A1 * | 9/2009 | Hanner | ................... | G01C 21/08 |
| | | | | 455/456.1 |
| 2011/0294426 A1 * | 12/2011 | Matsubara | ............. | H04N 7/141 |
| | | | | 455/41.2 |
| 2011/0298824 A1 * | 12/2011 | Lee | .......................... | G06F 3/011 |
| | | | | 345/633 |
| 2012/0297019 A1 * | 11/2012 | Ting | ........................ | G06F 3/038 |
| | | | | 709/217 |
| 2013/0043308 A1 * | 2/2013 | Wilkinson | .......... | G06K 7/10178 |
| | | | | 235/439 |
| 2014/0206288 A1 * | 7/2014 | Liu | ........................ | H04W 12/04 |
| | | | | 455/41.2 |
| 2014/0243011 A1 * | 8/2014 | Pan | ........................ | H04W 64/00 |
| | | | | 455/456.1 |
| 2015/0053144 A1 * | 2/2015 | Bianchi | ................ | A01K 27/001 |
| | | | | 119/720 |
| 2015/0147968 A1 | 5/2015 | Friedman et al. | | |
| 2015/0236922 A1 | 8/2015 | Xiong et al. | | |
| 2015/0369900 A1 * | 12/2015 | Pan | ........................ | G01S 5/0252 |
| | | | | 455/456.6 |

FOREIGN PATENT DOCUMENTS

| | | |
|---|---|---|
| JP | 2011-096102 A | 5/2011 |
| JP | 2011-518452 A | 6/2011 |
| JP | 2012-059090 A | 3/2012 |
| WO | 2013/124851 A1 | 8/2013 |

OTHER PUBLICATIONS

English translation of the International Search Report for PCT/JP2015/057594.

\* cited by examiner

FIG.6

| TERMINAL ID | RELATIVE POSITION |
|---|---|
| A | $(\gamma_A, \theta_A)$ |
| B | $(\gamma_B, \theta_B)$ |
| C | $(\gamma_C, \theta_C)$ |

WIRELESS MOBILE COMMUNICATION APPARATUS, WIRELESS COMMUNICATION METHOD AND PROGRAM

CROSS REFERENCE TO RELATED APPLICATIONS

This application is a National Stage of International Application No. PCT/JP2015/057596 filed on Mar. 13, 2015. The contents of the above document is incorporated herein by reference in its entirety.

TECHNICAL FIELD

The present invention relates to a portable wireless communication device, a wireless communication method, and a program, and more particularly, to specifying a partner communication device in communication between portable wireless communication devices.

BACKGROUND ART

In Patent Literature 1, there is disclosed a technology that enables a remote control terminal serving as a connection device to connect to a television serving as a connection-receiving device by registering in advance bearing information on the television on the remote control terminal side, and performing an operation that indicates a bearing of the connection-receiving device, for example, tapping that direction, with the connection device. According to the technology disclosed in Patent Literature 1, it is possible to transmit and receive data by merely inputting the direction of the connection-receiving device, to thereby realize an intuitive user interface.

CITATION LIST

Patent Literature

[PTL 1] JP 2912-59090 A

SUMMARY OF INVENTION

Technical Problem

However, in the above-mentioned related art, it is necessary to register in advance the bearing information on the connection-receiving device in association with identification information on that device, and to re-register the bearing information when the connection-receiving device has moved. In other words, the above-mentioned related art is not suited to a case in which both the connection device and the connection-receiving device are portable wireless communication devices.

The present invention has been made in order to solve the above-mentioned problem, and has an object to provide a portable wireless communication device, a wireless communication method, and a program that are capable of transmitting data to a desired device among a plurality of portable wireless communication devices through an intuitive operation.

Solution to Problem

In order to solve the above-mentioned problem, a portable wireless communication device according to one aspect of the present invention includes: relative position storage means for storing a relative position of each of a plurality of partner communication devices; movement destination information reception means for sequentially receiving movement destination information indicating a movement destination of each of the plurality of partner communication devices; relative position update means for updating the relative position of each of the plurality of partner communication devices based on the movement destination information; reception means for receiving specification of a communication direction by user; identification means for identifying one of the plurality of partner communication devices based on the communication direction and the relative position of each of the plurality of partner communication devices; and transmission means for transmitting data to the identified one of the plurality of partner communication devices.

Further, a wireless communication method according to one aspect of the present invention includes: a movement destination information reception step of sequentially receiving movement destination information indicating a movement destination of each of a plurality of partner communication devices; a relative position update step of updating a relative position of each of the plurality of partner communication devices based on the movement destination information; a reception step of receiving specification of a communication direction by a user; an identification step of identifying one of the plurality of partner communication devices based on the communication direction and the relative position of each of the plurality of partner communication devices; and a transmission step of transmitting data to the identified one of the plurality of partner communication devices.

In addition, a program according to one aspect of the present invention is a program for causing a computer to function as: relative position storage means for storing a relative position of each of a plurality of partner communication devices; movement destination information reception means for sequentially receiving movement destination information indicating a movement destination of each of the plurality of partner communication devices; relative position update means for updating the relative position of each of the plurality of partner communication devices based on the movement destination information; reception means for receiving specification of a communication direction by a user; identification means for identifying one of the plurality of partner communication devices based on the communication direction and the relative position of each of the plurality of partner communication devices; and transmission means for transmitting data to the identified one of the plurality of partner communication devices. This program may be stored in a computer-readable information storage medium.

BRIEF DESCRIPTION OF DRAWINGS

FIG. 6 is a diagram for schematically illustrating storage content of a relative position information storage unit.

DESCRIPTION OF EMBODIMENTS

An embodiment of the present invention is specifically described below in detail with reference to the drawings.

Figure 1:
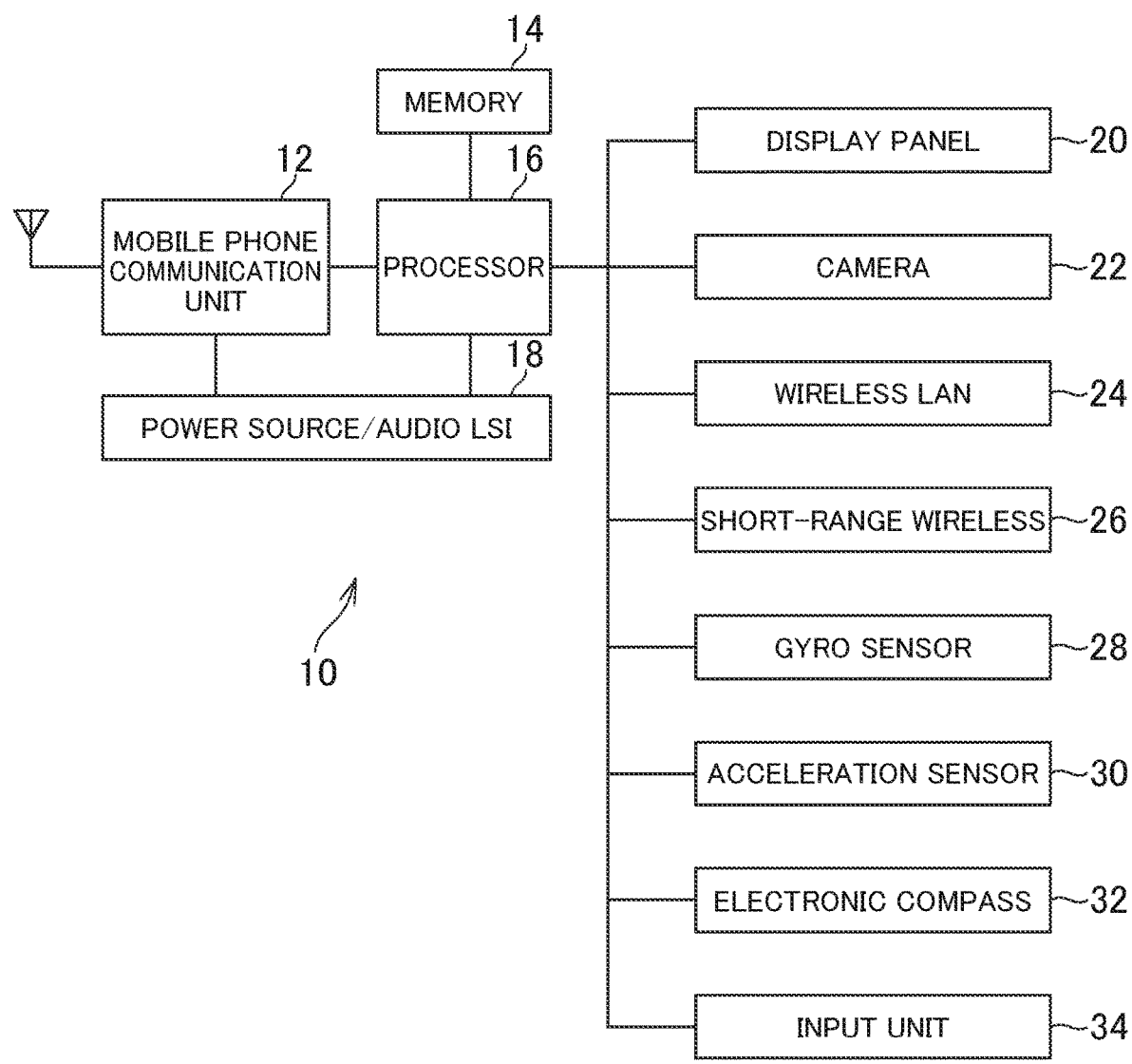
FIG. 1 is a diagram for illustrating a configuration of a portable wireless communication device according to an embodiment of the present invention.
Figure 2:
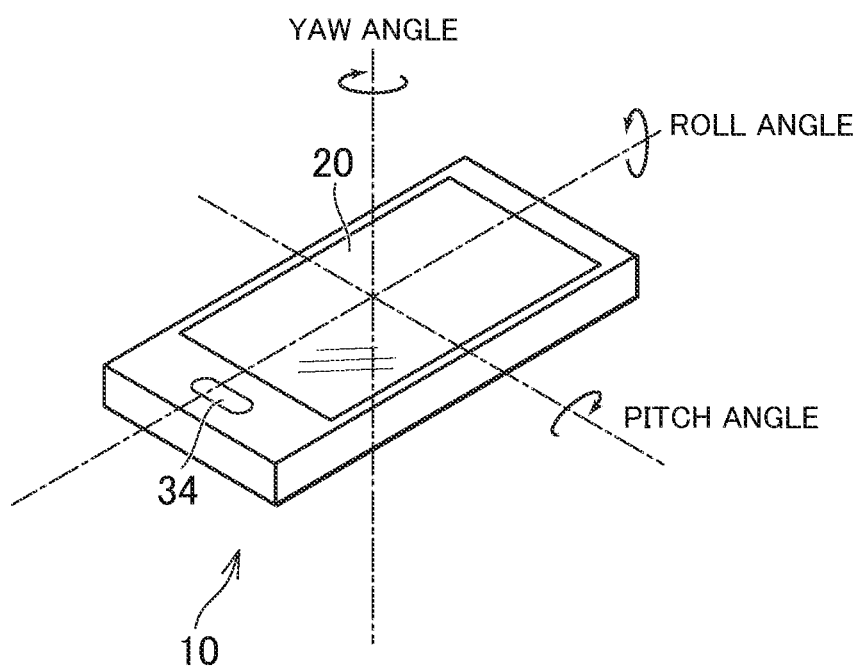
FIG. 2 is an external perspective view for illustrating the portable wireless communication device according to the embodiment of the present invention.

FIG. 1 is a diagram for illustrating a configuration of a portable wireless communication device according to the embodiment of the present invention. A portable wireless communication device 10 illustrated in FIG. 1 is configured as a smart phone, and includes a mobile phone communication unit 12, a memory 14, a processor 16, a power source/audio LSI 18, a display panel 20, a earners 22, a wireless LAN communication unit 24, a short-range wireless communication unit 26, a three-axis gyro sensor 28, a three-axis acceleration sensor 30, an electronic compass 32, and an input unit 34. As illustrated in FIG. 2, the portable wireless communication device 10 includes, for example, a thin rectangular-shaped housing, and includes, on a surface of the housing, a plate-like display panel 20 and button which is a part of the input unit 34.

In FIG. 1, the mobile phone communication unit 12 includes a modem and a wireless communication unit, and is configured to carry out mobile phone wireless communication in accordance with various communication standards for mobile phones. The memory 14 includes a volatile memory and a non-volatile memory, and is accessed by the processor 16. The processor 16 includes a CPU and an internal memory, and is configured to control the portable wireless communication device 10 through execution of a program. The display panel 20 is formed of, for example, a liquid crystal display panel or an organic EL panel, and is configured to output display data supplied by the processor 16. The camera 22 is configured to pick up a still image and a movie. The wireless LAN communication unit 24 is configured to carry out wireless LAN communication in accordance with the IEEE 802.11 standard. The short-range wireless communication unit 26 is configured to carry out power-saving wireless communication to/from a device that is relatively close to the portable wireless communication device 10. The short-range wireless communication is carried out via, for example, Bluetooth (trademark).

As illustrated in FIG. 2, the three-axis gyro sensor 28 is configured to detect a roll angular velocity of the housing centered on a roll axis set in a longitudinal direction of the display panel 20, a pitch angular velocity of the housing centered on a pitch axis set in a lateral direction of the display panel 20, and a yaw angular velocity of the housing centered on a yaw axis set in a normal direction of the display panel 20. The processor 16 time-integrates those values, to thereby obtain attitude information, that is, a roll angle, a pitch angle, and a yaw angle.

The three-axis acceleration sensor 30 is configured to detect an acceleration of the housing in directions of three axis illustrated in FIG. 2. The processor 16 can determine which orientation in a horizontal direction the housing is held in, and how far the housing has moved in which orientation, based on the acceleration in those three directions. The short-range wireless communication unit 26 is configured to acquire a reception level (received signal strength indicator (RSSI)) of a wireless signal that is transmitted from another portable wireless communication device 10. Therefore, the processor 16 can determine which position the housing is in also from the reception level. Specifically, the distance of movement caused by uniform motion cannot be known from the value output from the three-axis acceleration sensor 30 alone, and hence the processor 16 uses the reception level of the wireless signal from the another portable wireless communication device 10 together with the three-axis acceleration, to thereby be able to accurately calculate the position of the own device.

The electronic compass 32 is configured to output information on which bearing the roll axis set in the housing (see FIG. 2) is facing by detecting the orientation of earth magnetism. The electronic compass 32 can acquire the correct bearing when the pitch angle and the roll angle of the housing from horizontal plane are less than a fixed angle. In order to obtain a more accurate beaming, a bearing output by the electronic compass 32 may be corrected by a value output by the gyro sensor 28. The input unit 34 is formed of buttons provided on the surface of the housing, and a touch panel provided on the surface of the display panel 20.

In this embodiment, the portable wireless communication device 10 executes a data communication program that transmits/receives data to/from the another portable wireless communication device 10 via the short-range wireless communication unit 26. As described above, the short-range wireless communication unit 26 carries out data communication via Bluetooth in this embodiment. Two or more portable wireless communication devices 10 are directly or indirectly connected to each other via Bluetooth and whole of them form a network (see FIG. 12). As described below, the portable wireless communication device 10 functionally includes a data relay unit 10i (see FIG. 3). The data, relay unit 10i is configured to forward various pieces of data that have been transmitted from the another portable wireless communication device 10 to still another portable wireless communication device 10. As a result, data can be transmitted to any portable wireless communication device 10 in the network. Data can also be shared as necessary with all the portable wireless communication devices 10.

Figure 3:
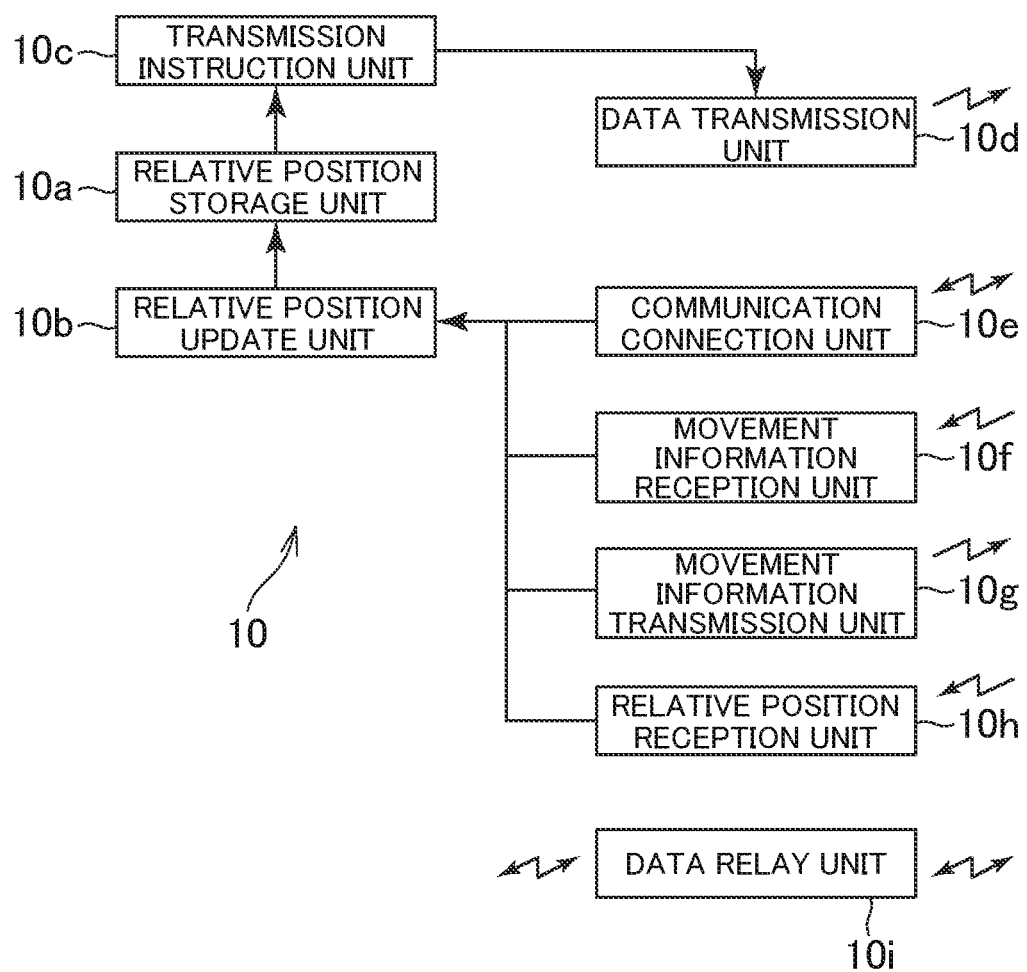
FIG. 3 is a functional block diagram for illustrating the portable wireless communication device according to the embodiment of the present invention.

FIG. 3 is a functional block diagram for illustrating the portable wireless communication device 10 when data is transmitted/received via short-range wireless communication. Functions illustrated in FIG. 3 are implemented by the processor 16 executing the data communication program. As illustrated in FIG. 3, the portable wireless communication device 10 functionally includes a relative position storage unit 10a, a relative position update unit 10b, a transmission instruction unit 10c, a data transmission unit 10d, a communication connection unit 10e, a movement information reception unit 10f, a movement information transmission unit 10g, a relative position reception unit 10h, and the data relay unit 10i. The data communication program may be downloaded from a communication network, for example, a mobile phone network, or may be installed from various types of memory cards.

The communication connection unit 10e is configured to establish a communication connection with the another portable wireless communication device 10. According to the related art, a communication connection procedure called "pairing" needs to be manually carried out between two portable wireless communication devices 10 in order to establish a connection for short-range wireless communication. In this embodiment, that procedure is intuitively carried out as described below.

Figure 4:
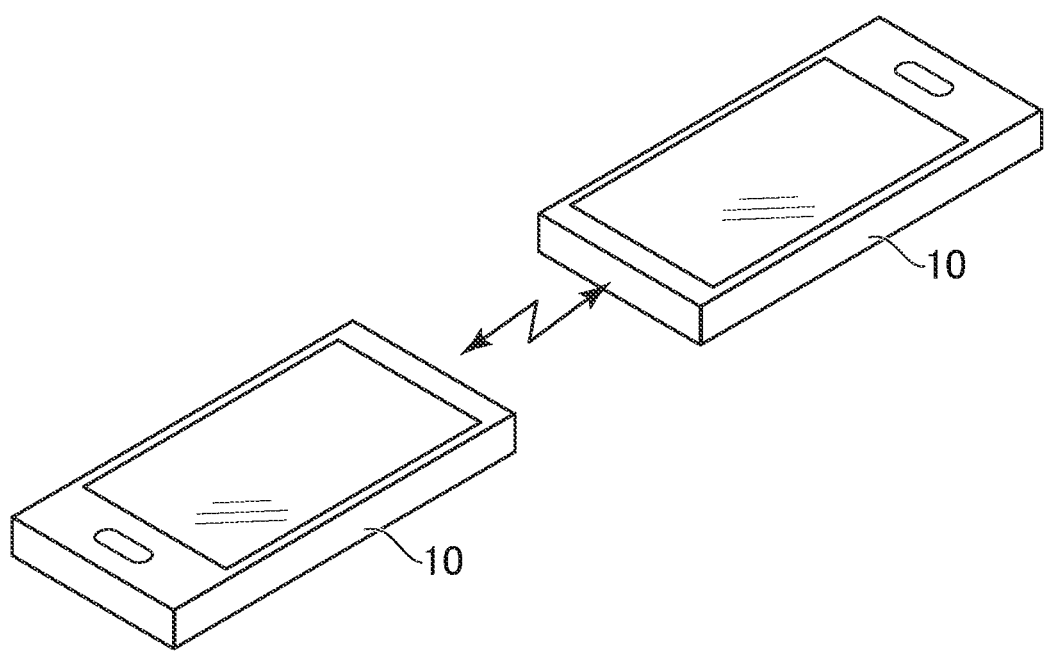
FIG. 4 is a diagram for illustrating a task of establishing a communication connection between two portable wireless communication devices.

FIG. 4 is a perspective view for illustrating two portable wireless communication devices 10 undergoing the connection procedure, and is an illustration of a procedure for establishing a wireless communication connection between the portable wireless communication devices 10 according to this embodiment. As illustrated in FIG. 4, each user of the two portable wireless communication devices 10 holds his or her portable wireless communication device 10 and brings the portable wireless communication device 10 closer to the other portable wireless communication device 10. At this time, each user changes, while watching their partner's portable wireless communication device 10, the position and attitude of his or her own portable wireless communication device 10 so that the two portable wireless communication devices 10 come closer to each other, and their housings face each other.

Each portable wireless communication device 10 acquires the bearing in which the portable wireless communication device 10 is facing from the electronic compass 32. Further, each portable wireless communication device 10 receives, from the partner device via the short-range wireless communication unit 26, the bearing obtained from the electronic compass 32 of the partner device. Further, each portable wireless communication device 10 acquires, from the short-range wireless communication unit 26, a reception level of a wireless signal from the partner device.

Then, based on the bearings of the two portable wireless communication devices 10 and the reception level of the wireless signal from the partner device, the portable wireless communication device 10 determines whether or not to establish a communication connection to the partner device. More specifically, when a value obtained by subtracting 180° from a difference in bearings is less than a predetermined value and the reception level is equal to or more than a certain value (in this case, when the RSSI corresponds to "Immediate"), the communication connection to the partner device is established.

According to this embodiment, as described above, each user performs, while watching their partner's portable wireless communication device 10, an intuitive operation of changing the position and attitude of his or her own portable wireless communication device 10 so that the two portable wireless communication devices 10 come closer to each other and their housings face each other. As a result, the communication connection can be established between the two portable wireless communication devices 10.

Figure 5:
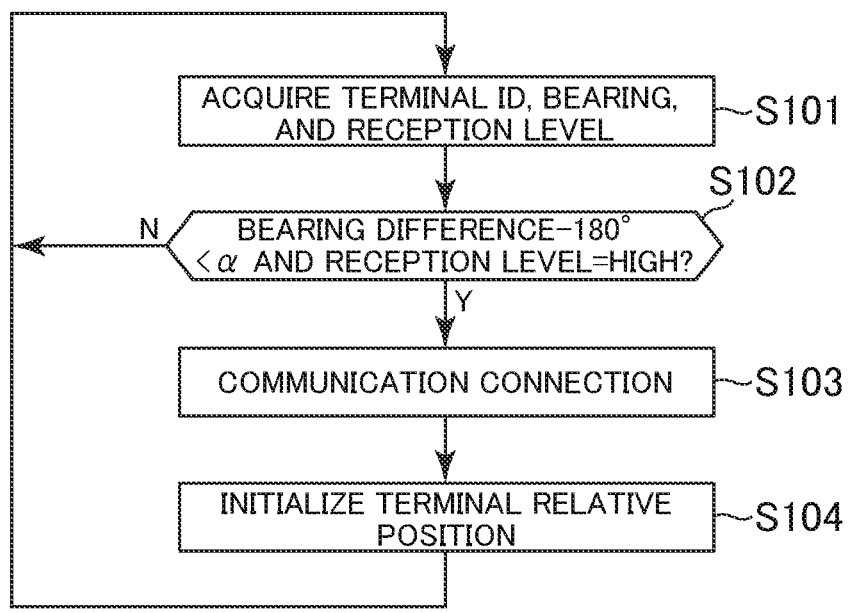
FIG. 5 is a flowchart for illustrating a communication connection in the portable wireless communication device according to the embodiment of the present invention.

FIG. 5 is a flowchart for illustrating processing of the communication connection unit 10e. Processing illustrated in FIG. 5 (S101 to S104) is iterated every predetermined period when a communication function is started in the portable wireless communication device 10. Further, the portable wireless communication device 10 constantly broadcasts advertisement packets via Bluetooth Low Energy (LE). The advertisement packets include the terminal ID of the portable wireless communication device 10 and the bearing output from the electronic compass 32.

When the portable wireless communication device 10 establishes a communication connection to another portable wireless communication device 10, the portable wireless communication device 10 first reads the terminal ID and the bearing from a reception buffer included in the short-range wireless communication unit 26. Those pieces of data are acquired from an advertisement packet transmitted from the another portable wireless communication device 10. The portable wireless communication device 10 further acquires the reception level of the received advertisement packet from the short-range wireless communication unit 26 (S101).

Next, the portable wireless communication device 10 acquires the bearing from the electronic compass 32, and determines whether or not a value obtained by subtracting 180° from a difference between the obtained bearing and a bearing received from the another portable wireless communication device 10 is less than a predetermined value $\alpha$. The portable wireless communication device 10 further determines whether or not the reception level obtained in Step S101 is equal to or more than a predetermined value (in this case, RSSI="Immediate") (S102). When the determination in Step S102 is positive, a communication connection to the another portable wireless communication device 10 is established (S103). For example, the two devices exchange link keys, which are pieces of authorization information, to thereby enter a state in which encrypted communication between the devices is possible. Further, the portable wireless communication device 10 instructs the relative position update unit 10b to initialize the relative position of the partner device, and transmits a terminal ID (connection-receiving terminal ID) of the partner device that has newly been connected, an initial relative position (to be described later), and a terminal ID (connection terminal ID) of the own device to the already-connected another portable wireless communication device 10 (S104). The processing then returns to Step S101, The initialization of the relative position is to be described later. When the determination in Step S102 is negative, the processing in Steps S103 and S104 is skipped, and the processing returns to Step S101.

The relative position storage unit 10a is configured to store the relative position of the another portable wireless communication device 10 that has already established a communication connection therein. FIG. 6 is a diagram for schematically illustrating storage content of the relative position information storage unit 10a. The relative position indicates position coordinates of the another portable wireless communication device 10 in a coordinate system centered on the own device. The relative position is, for example, described by a polar coordinate system.

The relative position update unit 10b is configured to update the relative position of the another portable wireless communication device 10, which is stored in the relative position storage unit 10a. As described above, when a communication connection to the another portable wireless communication device 10 is established, the communication connection unit 10e instructs the initialization of the relative position (S104 in FIG. 5). This is because, when a communication connection to the another portable wireless communication device 10 is to be established, the partner device can be regarded as being positioned right in front of the own device at the timing at which the communication connection is established. Accordingly, the relative position update unit 10b stores, in the relative position storage unit 10a, the position right in front of the own device, for example, a position 0.5 m in front of the own device, as the initial relative position in association with the terminal ID which has already been acquired by the communication connection unit 10e. Specifically, for example, when a polar coordinate system is used, (0.5, 0) is stored in the relative position storage unit 10a as the initial relative position. The relative position update unit 10b may determine how far in front of the own device the partner device is located based on the value of the reception level, and determine the initial relative position based on that value.

Further, as described above, when a communication connection to the portable wireless communication device 10 is newly established, the communication connection unit 10 transmits the connection-receiving terminal ID, the initial relative position, and the connection terminal ID to all the other portable wireless communication devices 10 that are directly or indirectly connected. Those pieces of information are received by the relative position reception unit 10h of the another portable wireless communication device 10. The relative position update unit 10b reads the relative position stored in association with the connection terminal ID from the relative position storage unit 10a, and performs vector addition on the read relative position and the initial relative position received by the relative position reception unit 10h. As a result, the relative position of the portable wireless communication device 10, which has been newly connected to the network, is calculated with respect to the own device. Then, the relative position update unit 10b stores the calculated relative position in the relative position storage unit 10a in association with the connection-receiving terminal ID that is received by the relative position reception unit 10h. For example, under a state in which a portable wireless communication device B is connected to a portable wireless communication device A, when a portable wireless communication device C is newly connected to the portable wireless communication device B, the portable wireless communication device B transmits, to the portable wireless communication device A, a terminal ID (connection-receiving terminal ID) of the portable wireless communication C, a terminal ID (connection terminal ID) of the portable wireless communication device B, and the initial relative position of the portable wireless communication device C with respect to the portable wireless communication device B. In the portable wireless communication device A, a vector indicating the relative position of the portable wireless communication B with respect to the portable wireless communication device A and a vector indicating the initial relative position received from the portable wireless communication device B are added together, to thereby obtain a vector indicating the relative position of the portable wireless communication device C with respect to the portable wireless communication device A. The relative position update unit 10b of the portable wireless communication device A stores the relative position indicated by the obtained vector in the relative position storage unit 10a in association with the terminal ID of the portable wireless communication device C.

The movement information transmission unit 10g monitors the output from the acceleration sensor 30, and when it is determined, based on the output of the acceleration sensor 30, that the housing has moved with translational motion, the movement information transmission unit 10g transmits information on the relative movement destination, that is, the movement direction and the movement amount to the another portable wireless communication device 10 that is with communication connection. In order to calculate the movement direction and the movement amount, a reception level of a wireless signal output from the another portable wireless communication device 10 may be used in addition to the above-mentioned value output from the acceleration sensor 30, Further, the movement information reception unit 10f receives the movement direction and the movement amount which are transmitted in this way from the another portable wireless communication device 10 with communication connection.

When the movement information reception unit 10f receives the movement direction and the movement amount from the another portable wireless communication device 10, the relative position update unit 10b moves, by the received movement amount in the received movement direction, the relative position stored in association with the terminal ID of the portable wireless communication device 10, to thereby update the relative position. Further, when the movement information transmission unit 10g transmits the movement direction and the movement amount to the another portable wireless communication device, the relative position update unit 10b moves, by the transmitted movement amount in a direction opposite to the transmitted movement direction, all of the relative positions stored in the relative position storage unit 10a, to thereby update those relative positions. In this way, the relative position storage unit 10a accurately stores the relative positions of all the portable wireless communication devices 10 that have established a communication connection.

The transmission instruction unit 10c is configured to receive specification of a communication direction by the user. Then, the transmission instruction unit 10c identifies one portable wireless communication device 10 to serve as a transmission destination based on the specified communication direction and the relative position of the another portable wireless communication device 10, which is stored in the relative position storage unit 10a. Specifically, the transmission instruction unit 10c identifies, as the transmission destination, one portable wireless communication device 10 within a predetermined distance with respect to a straight line that extends from the own device in the direction specified by the user.

The transmission instruction unit 10c may receive specification of the communication direction through a swipe operation on a touch panel mounted to the display panel 20, that is, an operation of sliding a finger or a stylus in a predetermined direction under a state in which the finger or the stylus is in contact with the touch panel. In this case, the direction of the swipe operation may be set as the communication direction. Alternatively, the transmission instruction unit 10c may receive specification of the communication direction based on the orientation of the housing. In this case, the transmission instruction unit 10c may identify the orientation of the housing from the output of the electronic compass 32 and the gyro sensor 28, to thereby set the orientation as the communication direction.

Figure 7:
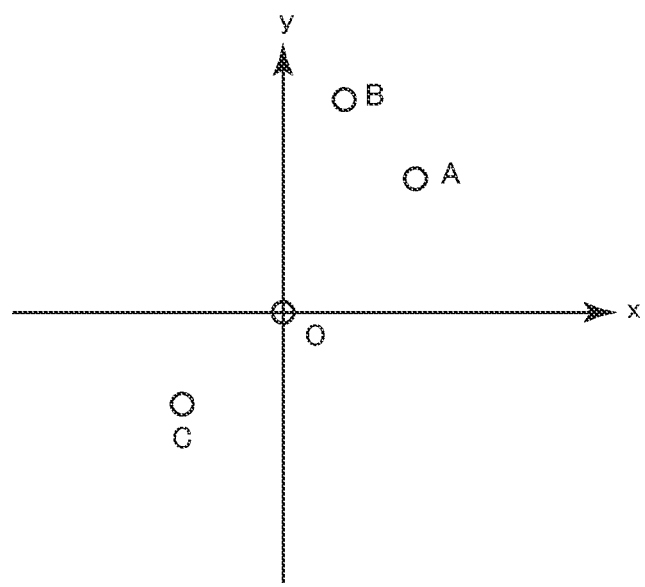
FIG. 7 is a graph for showing an example of arrangement of three portable wireless communication devices.
Figure 8:
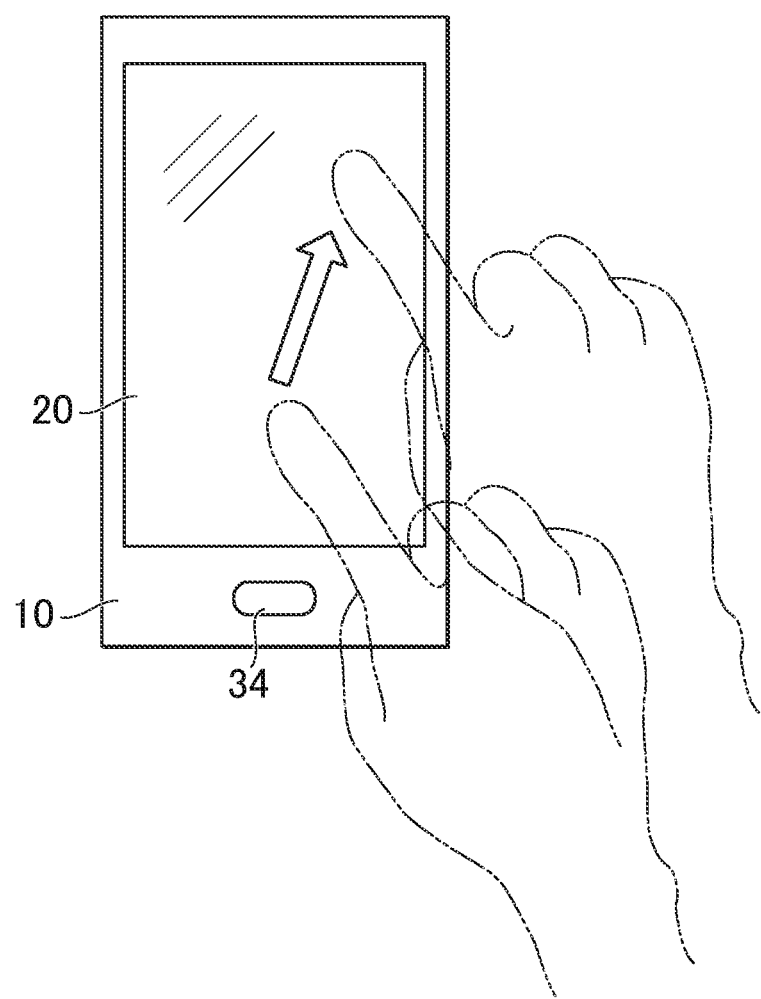
FIG. 8 is a diagram for illustrating an operation of transmitting data to a desired portable wireless communication device.

FIG. 7 is a graph for showing an example of arrangement of three portable wireless communication devices (A to C). In FIG. 7, the origin of the xy coordinate system indicates the position of the own device, and the circles labelled A to C indicate positions of already-connected portable wireless communication devices. FIG. 8 is a diagram for illustrating an operation of transmitting data to the portable wireless communication device B in FIG. 7. The portable wireless communication device 10 illustrated in FIG. 8 is arranged horizontally so that the top of the portable wireless communication device 10 faces a y-direction in FIG. 7. As illustrated in FIG. 8, when the user performs the swipe operation in a lower-left to upper-right direction on the touch panel mounted to the display panel 20, the portable wireless device B, which corresponds to the direction of the swipe operation, is identified as the transmission destination by the transmission instruction unit 10c. That is, the portable wireless communication device B is located in the direction of the arrow indicating the direction of the swipe operation in FIG. 8.

Figure 9:
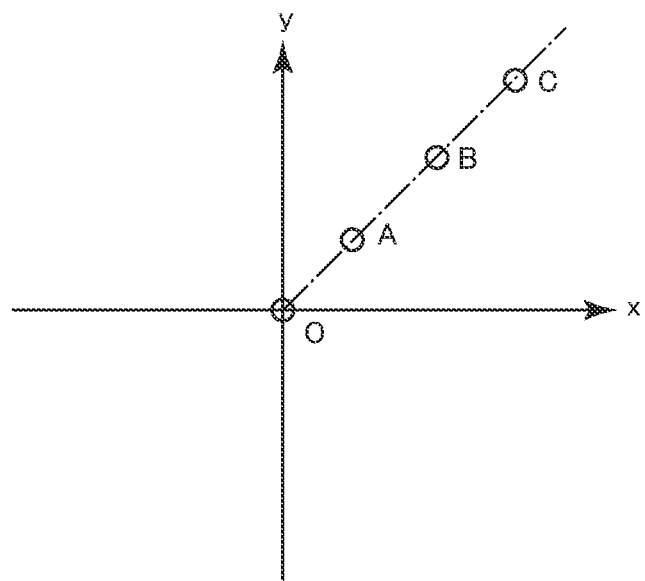
FIG. 9 is a graph for showing another example of arrangement of three portable wireless communication devices.

Further, when a plurality of already-connected portable wireless communication devices 10 exist in the specified communication direction, the transmission instruction unit 10c uses other information, for example, the inclination of the portable wireless communication device 10, to identify one of those portable wireless communication devices 10 as the transmission destination. FIG. 9 is a graph for snowing how three already-connected portable wireless communication devices A to C are located on a straight line as seen from the own device. In such a case, for example, the transmission instruction unit 10c acquires a pitch angle of each of the portable wireless communication devices 10, and identifies one of the portable wireless communication devices 10 as the transmission source based on the magnitudes of those pitch angles. In the example of FIG. 9, the portable wireless communication device A is identified as the transmission destination when the pitch angle is within a first range, and the portable wireless communication device B is identified as the transmission destination when the pitch angle is within a second range, which is larger than the first range. Further, the portable wireless communication device C is identified as the transmission destination when the pitch angle is within a third range, which is larger than the first and second ranges. Further, a roll angle may be used instead at the pitch angle. Alternatively, the direction of the swipe operation, that is, the inclination of the housing with respect to the communication direction may be calculated based on the output from the gyro sensor 28 and the acceleration sensor 30, and that value may be used.

Alternatively, the transmission instruction unit 10c may acquire a swipe length of the swipe operation when specifying the communication direction, that is, the distance the finger or stylus slid across the touch panel, to thereby identify the transmission destination based on the magnitude of the swipe length. In the example of FIG. 9, the portable wireless communication, device A is identified as the transmission destination when the swipe length is within a first range, and the portable wireless communication device B is identified as the transmission destination when the swipe length is within a second range, which is larger than the first range. Further, the portable wireless communication device C is identified as the transmission destination when the swipe length is within a third range, which is larger than the first and second ranges. A swipe speed, that is, a value obtained by dividing the distance the finger or stylus slid by the time required for the swipe may be used instead of the swipe length. Further, a swipe time length, that is, a period of elapsed time from when the finger or the stylus makes contact with the touch panel to when the finger or the stylus is separated from the touch panel may be used. Even when a touch panel with a small area is used, a significant difference can be easily expressed when the swipe speed and swipe time length are used, and hence good operability can be realized.

The data transmission unit 10d uses the short-range wireless communication unit 26 to transmit data, for example, messages and files, to the already-connected portable wireless communication device 10 that was identified by the transmission instruction unit 10c.

Figure 10:
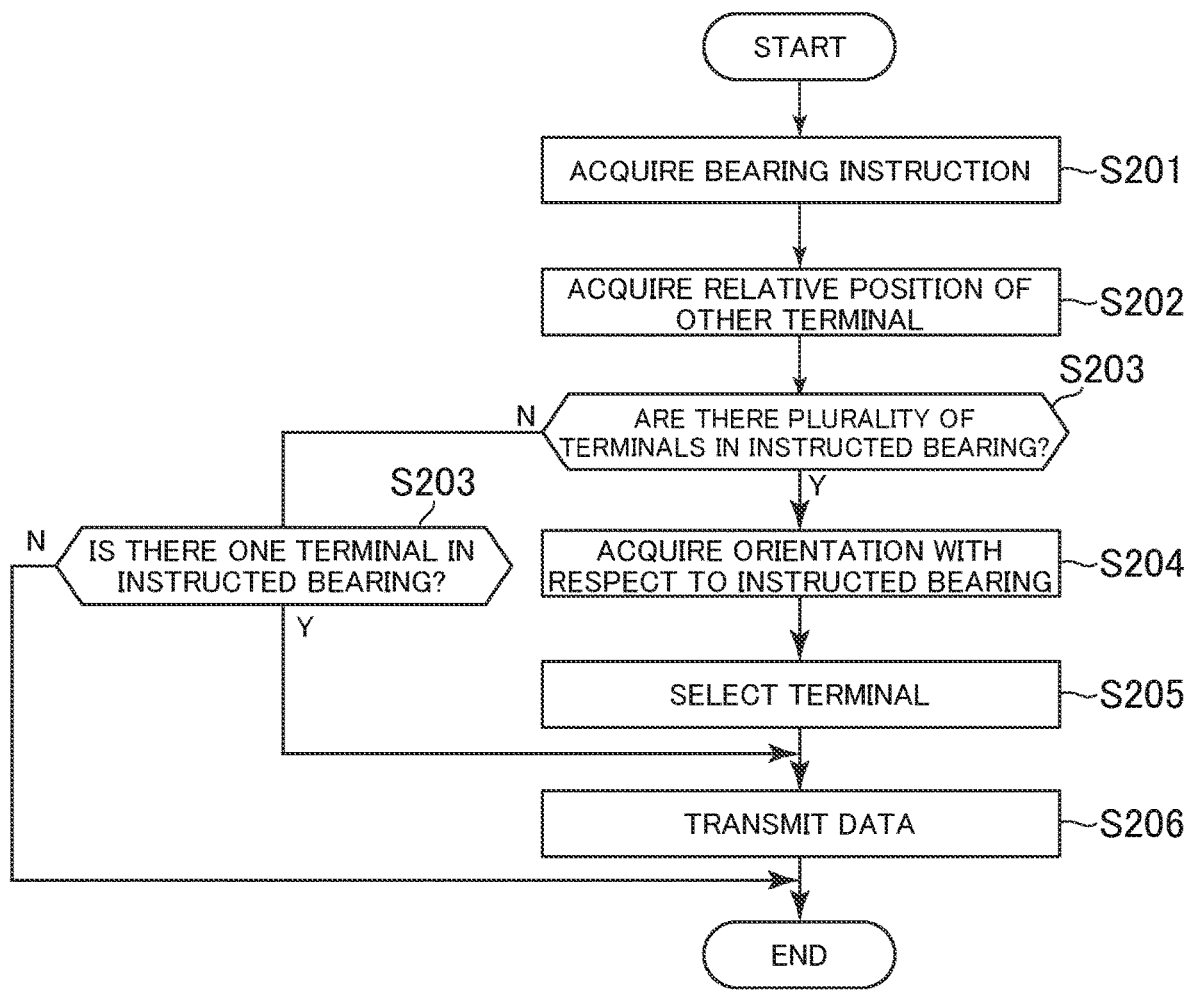
FIG. 10 is a flowchart for illustrating data transmission processing in the portable wireless communication device according to the embodiment of the present invention.

FIG. 10 is a flowchart for illustrating data transmission processing in the portable wireless communication device 10. As illustrated in FIG. 10, in the portable wireless communication device 10, the transmission instruction unit 10c first receives specification of the communication direction from the user (S201). Next, the transmission instruction unit 10c accesses the relative position storage unit 10a, and reads the relative positions of all of the other already-connected portable wireless communication devices 10 (S202). Then, it is determined whether or not there exist a plurality of portable wireless communication devices 10 located within a predetermined distance with respect to a straight line that extends from the own device in the specified communication direction (S203). When the determination in Step S203 is positive, for example, the portable wireless communication device 10 calculates the inclination of the housing with respect to the communication direction (S204), and selects one portable wireless communication device 10 based on that value (S205). After that, the data transmission unit 10d transmits data to the selected portable wireless communication device 10.

When the determination in Step S203 is negative, it is determined whether or not there exists one portable wireless communication device 10 located within the predetermined distance with respect to the straight line that extends from the own device in the specified communication direction (S207). When the determination in Step S207 is positive, the data transmission unit 10d transmits data to the one portable wireless communication device 10 (S206). Further, when the determination in Step S207 is negative, the transmission destination of the data is regarded as being impossible to identify, and the data transmission processing ends.

Figure 11:
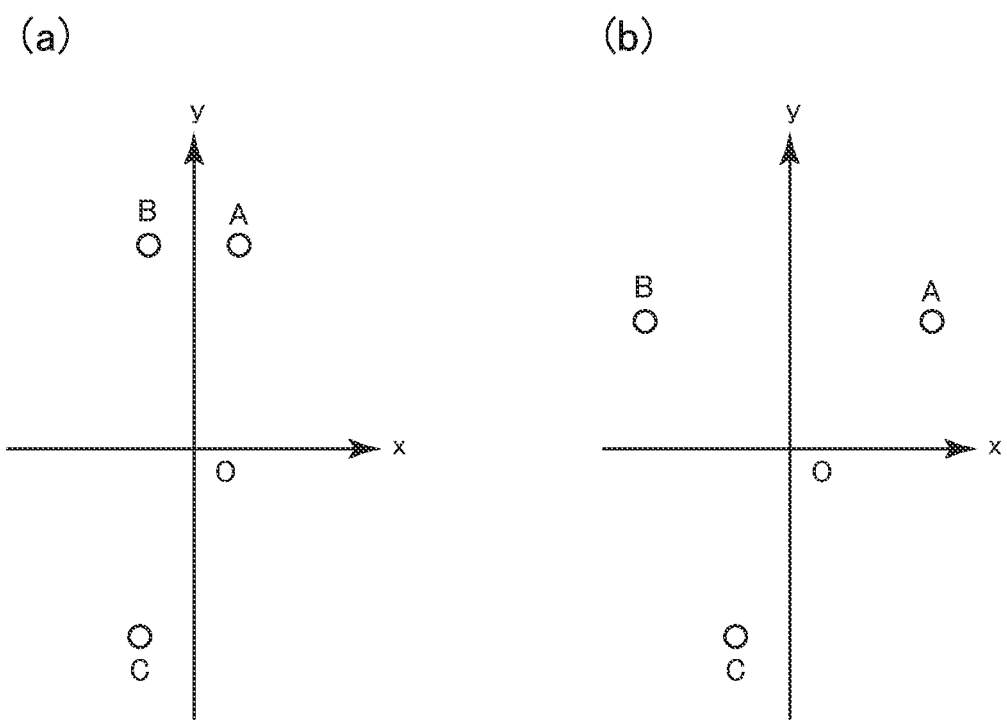
FIG. 11 are graphs for showing correction of relative positions of portable wireless communication devices.

In the description given above, the relative position of each of the already-connected portable wireless communication devices 10 is accurately acquired, and the transmission destination is identified based on those relative positions and the communication direction specified by the user. However, the relative positions of the already-connected portable wireless communication devices 10 may be corrected, to thereby identify the transmission destination based on the corrected relative positions and the communication direction specified by the user. FIG. 11 are graphs for showing correction of the relative positions of the already-connected portable wireless communication devices 10. When the portable wireless communication device A and the portable wireless communication device B approach each other as illustrated in FIG. 11(a), as illustrated in FIG. 11(b), the relative positions of the portable wireless communication devices A and B may be virtually corrected so that the directions of the portable wireless communication devices A and B from the own device as a center, move away from each other. In such a case, when the user wishes to transmit data to the portable wireless communication device A, which is located in front of his or her own portable wireless communication device 10 to the right, a direction from the own device facing slightly more rightward than in actuality is input as the communication direction. In this way, the user can easily specify a desired device among the portable wireless communication devices A and B that are close to each other as the transmission destination.

Figure 12:
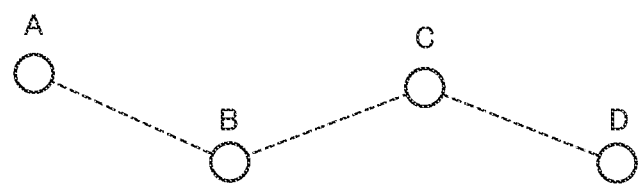
FIG. 12 is a diagram for illustrating a network formed of a plurality of portable wireless communication devices.

The data relay unit 10i relays data transmitted from the another portable wireless communication device 10. FIG. 12 is a diagram for illustrating an example of a network formed of portable wireless communication devices A to D. In the example of FIG. 12, for example, the portable wireless communication device A and the portable wireless communication device C are not directly connected to each other wirelessly. However, the data relay unit 10f of the portable wireless communication device B enables the portable wireless communication device A and the portable wireless communication device C to communicate to/from each other. In this way, according to this embodiment, transmission data, for example, the terminal ID, the movement information, the initial relative position, a message, or a file, is relayed by the data relay unit 10f, and hence those pieces of data are supplied to all of the portable wireless communication devices 10 that are connected directly or indirectly to one another.

According to the embodiment described above, through use of the movement directions and the movement amounts of all of the portable wireless communication devices 10 that form the network, the relative position of each of the other already-connected portable wireless communication devices 10 can be accurately maintained using those portable wireless communication devices 10 as references, and hence the transmission destination can be specified through an intuitive operation, for example, the swipe operation, even when those portable wireless communication devices 10 have moved.

The invention claimed is:

1. A portable wireless communication device, comprising:
   at least one processor; and
   at least one memory device that stores a plurality of instructions, which when executed by the at least one processor, causes the at least one processor to operate to:
   sequentially receive movement destination information indicating a movement destination of each of a plurality of partner communication devices;
   update a relative position of each of the plurality of partner communication devices based on the movement destination information, the relative position of each of the plurality of partner communication devices is stored in a storage;
   receive a communication direction by a user;
   identify a first partner communication device of the plurality of partner communication devices based on the communication direction and the relative position of each of the plurality of partner communication devices; and
   transmit data to the first partner communication device,
   wherein in a first set of positions, the first partner communication device and a second partner communication device have a first difference in direction between them when viewing the first and second partner communication devices from the portable wireless communication device as a center point;
   and in a second set of positions, the first partner communication device and the second partner communication device have a second difference in direction between them when viewing the first and second partner communication devices from the portable wireless communication device as a center point, where the second difference in direction is less than the first difference in direction,
   wherein the second set of positions is a change in the real position of the first partner communication device and the second partner communication device;
   wherein only in the second set of positions, the at least one processor calculates a virtually corrected relative position of the first partner communication device and the second partner communication device, resulting in a third set of positions;
   wherein in the third set of positions, a third difference in direction, of the virtually corrected relative position of the first partner communication device and the second partner communication device, when viewed from the portable wireless communication device as a center point, is greater than the second difference in direction; and
   wherein in the third set of positions, an actual position of the first partner communication device and the second partner communication device have not changed from the second position.

2. The portable wireless communication device according to claim 1, wherein
   the at least one processor receives bearing information on at least one of the plurality of partner communication devices from the each of the plurality of partner communication devices;
   the at least one processor acquires bearing information on the portable wireless communication device;
   the at least one processor acquires a reception level of a wireless signal output from the at least one of the plurality of partner communication devices;
   the at least one processor stores, when the reception level is a predetermined level or higher, and the bearing information on the at least one of the plurality of partner communication devices and the bearing information on the portable wireless communication device indicate that the at least one of the plurality of partner communication devices and the portable wireless communication device face each other, a predetermined position as the relative position of the at least one of the plurality of partner communication devices.

3. The portable wireless communication device according to claim 1,
   wherein, in the reception of the movement destination information, the at least one processor receives the movement destination information when any of the plurality of partner communication devices has moved.

4. The portable wireless communication device according to claim 1,
   wherein, in the identification, the at least one processor identifies said first partner communication device based on an orientation of the portable wireless communication device when the plurality of partner communication devices are located in the communication direction.

5. The portable wireless communication device according to claim 1,
   wherein, in the reception of the communication direction, the at least one processor receives the communication direction based on a direction of a swipe operation on a touch panel; and
   wherein, in the identification, the at least one processor identifies the first partner communication device based on a swipe length of the swipe operation when the plurality of partner communication devices are located in the received communication direction.

6. The portable wireless communication device according to claim 1,
   wherein, in the reception of the movement destination information, the at least one processor receives movement destination information of the second partner communication device from at least a third partner communication device via relay.

7. The portable wireless communication device according to claim 1, wherein:

the at least one processor receives, with respect to a fourth partner communication device of the plurality of partner communication devices, a relative position of a fifth partner communication device which is different from the fourth partner communication device;

the at least one processor reads a relative position of the fourth partner communication device with respect to the portable wireless communication device from the storage;

the at least one processor calculates the relative position of the fifth partner communication device with respect to the portable wireless communication device based on the received relative position and the read relative position; and the at least one processor stores the calculated relative position in the storage in association with the fifth partner communication device.

8. A wireless communication method, comprising:

a movement destination information reception step of sequentially receiving movement destination information indicating a movement destination of each of a plurality of partner communication devices;

a relative position update step of updating a relative position of each of the plurality of partner communication devices based on the movement destination information;

a reception step of receiving specification of a communication direction by a user;

an identification step of identifying one of the plurality of partner communication devices based on the communication direction and the relative position of each of the plurality of partner communication devices; and a transmission step of transmitting data to the identified one of the plurality of partner communication devices, wherein in a first set of positions, the first partner communication device and a second partner communication device have a first difference in direction between them when viewing the first and second partner communication devices from the portable wireless communication device as a center point;

and in a second set of positions, the first partner communication device and a second partner communication device have a second difference in direction between them when viewing the first and second partner communication devices from the portable wireless communication device as a center point, where the second difference in direction is less than the first difference in direction;

wherein the second set of positions is a change in the real position of the first partner communication device and the second partner communication device;

only in the second set of positions, a calculation step of calculating a virtually corrected relative position of the first partner communication device and the second partner communication device, resulting in a third set of positions;

wherein in the third set of positions, a third difference in direction, of the virtually corrected relative position of the first partner communication device and the second partner communication device, when viewed from the portable wireless communication device as a center point, is greater than the second difference in direction;

wherein in the third set of positions, an actual position of the first partner communication device and the second partner communication device have not changed from the second position.

9. A non-transitory computer readable storage medium storing a plurality of instructions, wherein when executed by at least one processor, the plurality of instructions cause the at least one processor to:

sequentially receive movement destination information indicating a movement destination of each of a plurality of partner communication devices;

update a relative position of each of the plurality of partner communication devices based on the movement destination information;

receive a communication direction by a user;

identify one of the plurality of partner communication devices based on the communication direction and the relative position of each of the plurality of partner communication devices; and transmit data to the identified one of the plurality of partner communication devices, wherein in a first set of positions the first partner communication device and a second partner communication device have a first difference in direction between them when viewing the first and second partner communication devices from the portable wireless communication device as a center point;

and in a second set of positions, the first partner communication device and a second partner communication device have a second difference in direction between them when viewing the first and second partner communication devices from the portable wireless communication device as a center point, where the second difference in direction is less than the first difference in direction;

wherein the second set of positions is a change in the real position of the first partner communication device and the second partner communication device;

only in the second set of positions, calculate a virtually corrected relative position of the first partner communication device and the second partner communication device, resulting in a third set of positions;

wherein in the third set of positions, a third difference in direction, of the virtually corrected relative position of the first partner communication device and the second partner communication device, when viewed from the portable wireless communication device as a center point, is greater than the first difference in direction;

wherein in the third set of positions, an actual position of the first partner communication device and the second partner communication device have not changed from the second position.

* * * * *